Figure 1:
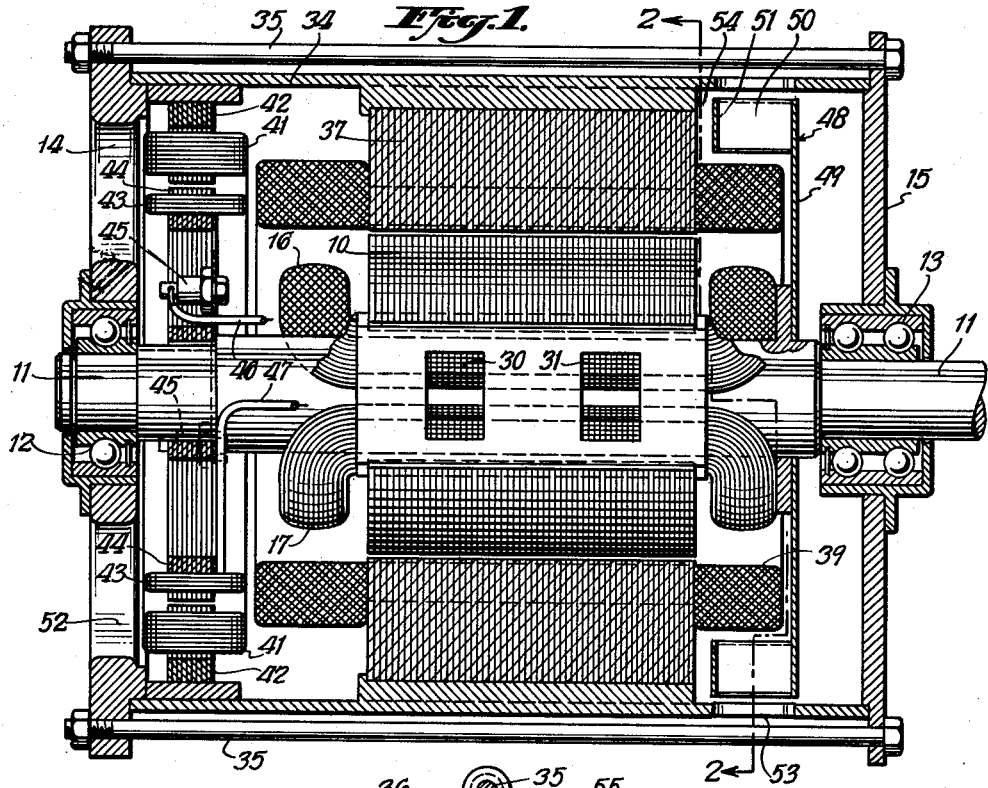

July 28, 1964  W. A. JONES  3,142,772
ELECTRICAL GENERATORS
Filed Oct. 11, 1960

INVENTOR.
WALTER A. JONES.
BY
Ward, Neal, Haselton, Orme & McClannon
ATTORNEYS.

United States Patent Office

3,142,772
ELECTRICAL GENERATORS
Walter A. Jones, Teaneck, N.J., assignor to
Ambrose P. Salmini, Yonkers, N.Y.
Filed Oct. 11, 1960, Ser. No. 62,028
4 Claims. (Cl. 310—62)

This invention relates to electrical generators and particularly to improvements in the construction thereof which provide improved heat dissipation therefrom.

The invention will be described with reference to alternating current generators or alternators, but it will be apparent from the principles of the invention described hereinafter that the invention is also applicable to other types of electrical generators. In general, prior art alternating current generators comprise stator or non-rotating laminations encircled by coils or windings of wire, a rotatable rotor also having laminations encircled by coils or windings of wire, means for supplying direct current to the rotor windings, such as, a commutator and brushes or an exciter, and a housing or casing enclosing these parts. The size and weight of such generators is determined primarily by the power output rating and the temperature which the parts of the generator can withstand while operating at rated output and with normally encountered overloads. It will be apparent therefore that for a given power output rating the size and weight of the generator is dependent upon the rate at which heat can be dissipated from the various component parts.

There are several sources of heat in a conventional generator and these sources include the laminations of the stator and rotor due to eddy current losses therein, the stator and rotor windings due to resistance losses therein and the means for supplying energizing power to or abstracting useful power from the rotor windings.

The rotor and stator laminations are made of high permeability steel so as to keep the magnetic losses to a minimum and so as to reduce the size and weight of the rotor and stator to a minimum. The rotor and stator are laminated for the purpose of keeping the eddy current losses to a minimum. However, with the best magnetic steels and with practical laminations, it has not been possible for those skilled in the art prior to this invention, to reduce the size of present day generators substantially as compared to generators which have been in use for many years. The principal limiting factor has been temperature rise in the generator, an increase in temperature decreasing the permeability of the steel and thereby increasing the amount of steel required over that required if the temperature of the laminations could be maintained lower than that previously obtainable.

Much effort has already been spent in reducing the heat losses in the coils or windings of the stator and rotor. The resistance of the wires can be reduced by the use of high conductivity materials, but for economical reasons, there are practical limits to the materials which can be employed. The resistance of the wires can also be reduced by increasing their size but of course this also increases the size of the generator. Efforts have also been directed toward distributing the windings and directing air thereon so as to lower the temperature thereof. It should be noted here that as the temperature of the windings increases the resistance thereof also increases thereby increasing the heat losses.

Improvement have also been made in the means for supplying energy to or abstracting energy from the rotor windings. For example, brushes and commutators which produce relatively high resistance losses have been replaced by exciters consisting of a separate exciting stator field, a separate exciting rotor winding and rectifiers. However, even though the latter components may reduce the heat losses in the generator as compared to generators employing brushes of commutators it has not been possible in the past by these devices alone to make substantial reductions in the size and weight of generators having a given power output rating.

The permissible temperature rise in a generator also is affected by the ability of the insulation on the wires of the coils or windings to withstand relatively high temperatures. Improved insulating materials have been developed but even with such insulating materials which are economically practical, the temperature within the generator should not exceed about 150° C.

It will be apparent from the foregoing that temperature and hence the rate at which heat is removed from the generator are important factors in determining the size and weight of a generator for a given power output. Furthermore, it will be apparent that the temperature of all parts in the generator must not exceed the permissible limits, it being insufficient to maintain a number of parts less than all the parts below the permissible temperatures for such parts.

Those skilled in the art have devoted considerable effort to improving the cooling of electrical generators such as by the use of ducts, fans, forced air cooling, etc. However, no significant results in the direction of reducing the size and weight of a generator of a given power rating have been achieved except in special cases where relatively large volumes of relatively cold air are available, such as in an aircraft. Obviously, the expedients adopted in the latter special cases are of little direct application in the greatest number of cases, namely in cases where the generators must operate at room temperature or above and the use of auxiliary air cooling equipment is undesirable.

I have discovered after devoting a large amount of research and testing to the problem that electrical generators of unexpectedly small size and weight for a given power rating may be constructed and will operate in surroundings at room temperatures or above by properly directing air through the generator at the proper velocities without the use of volumes of air which are large compared to those employed in the generators of the prior art. I have discovered that when a centrifugal fan, also known as a Sirocco, squirrel cage or blower fan, is employed within the generator and is disposed in a particular relationship with respect to the stator windings and the rotor a substantial improvement in the cooling of the generator is obtained. I have also discovered that the spacing of the rotor windings, exposure of the rotor windings to the space between the rotor and the stator and openings or channels in the stator laminations or between the stator laminations and the casing or housing are all significant factors in controlling the cooling of the generator and that proper control of each of these factors results in significant improvements in the cooling and hence the reduction of the temperature of the parts of the generator. Thus, by employing the principles of the invention, generators of a given power output but of smaller size and approximately one-half to one-sixth the weight of prior art generators of the same power output may be constructed. For example, the following table illustrates the differences in size and weight between generators of the invention and the smallest generators of corresponding rating available for room temperature use and manufactured by well known manufacturers as of the present date:

TABLE I

*Comparison of Generator of Invention With Prior Art Generators*

| Maker | Output, Kw. | Wt., lbs. | Size, Cu. Ft. |
| --- | --- | --- | --- |
| A | 3.0 | 169 | 0.9 |
| B | 3.5 | 108 | 1.4 |
| C | 3.5 | 200 | 0.7 |
| D | 3.0 | 120 | |
| Inventor | 3.5 | 48 | 0.6 |
| A | 5.0 | 243 | |
| C | 5.0 | 360 | 2.5 |
| D | 5.0 | 150 | |
| Inventor | 5.0 | 70 | 0.8 |
| A | 10.0 | 555 | 3.2 |
| B | 10.0 | 280 | 2.5 |
| C | 10.0 | 550 | 2.5 |
| Inventor | 10.0 | 123 | 0.9 |
| A | 15 | 855 | 6.0 |
| C | 15 | 850 | 9.0 |
| Inventor | 15 | 153 | 1.8 |

It will be noted from the foregoing table that for rated capacities up to ten kilowatts, the generators of the invention are smaller in size and weigh less than one-half the weight of such known prior art generators. Furthermore, at power output ratings of fifteen kilowatts, the generators of the invention are approximately one-quarter of the size and approximately one-sixth of the weight of the prior art generators. However, it should be noted here that in the foregoing comparison the ratings of the generators of the invention are, for the reasons hereinafter given, more conservative than those of the prior art generators. For example, if the generator of the invention which is rated at ten kilowatts in Table I were rated on the same basis as the other ten kilowatt generaors set forth in Table I, the corrected rating of the generator of the invention would be approximately thirteen kilowatts which further emphasizes the improvements obtained by the invention.

It is one object of the invention to provide an electrical generator that is smaller in size and substantially lighter in weight than prior art generators of corresponding ratings.

It is a further object of the invention to provide an electrical generator of small size and weight which is relatively simple and inexpensive to manufacture and which is reliable in operation.

Figure 2:
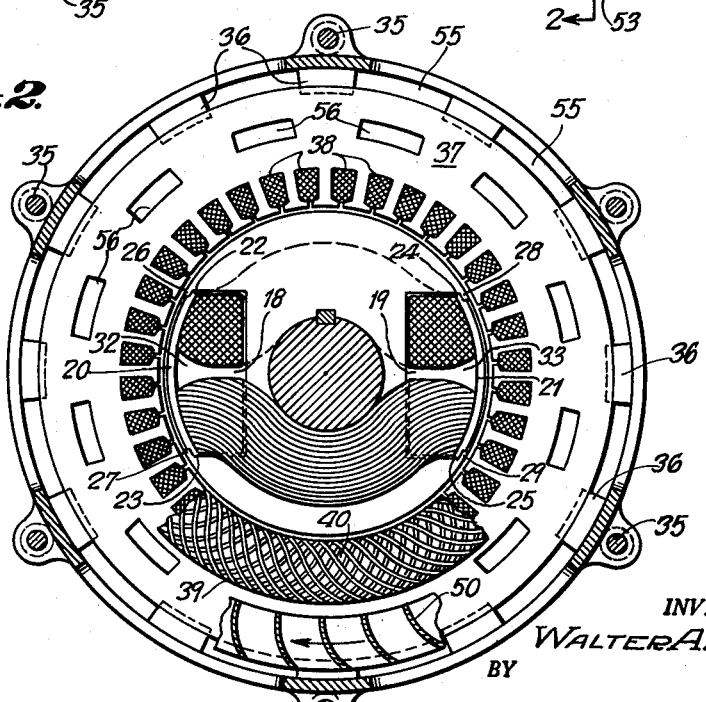

Other objects and advantages of the invention will be apparent from the following detailed description of a preferred embodiment thereof which description should be considered in conjunction with the accompanying drawing in which:

FIG. 1 is a longitudinal section of the preferred embodiment of the invention; and FIG. 2 is a transverse section of the embodiment illustrated in FIG. 1 and is taken along the line 2—2 indicated in FIG. 1.

The embodiment illustrated in FIGS. 1 and 2 comprises rotor laminations or core 10 of relatively high permeability, magnetic steel mounted on a shaft 11 supported by bearings 12 and 13 mounted on the housing or casing end plates 14 and 15. The rotor laminations 10 are encircled by a pair of rotor windings or coils 16 and 17 formed with insulated copper wire, the windings 16 and 17 being held within slots 18 and 19 in the rotor laminations 10 by means of a pair of closure or retaining plates 20 and 21. The plates 20 and 21 are held in place by virtue of the engagement of their side edges 22-25 with overhanging lips 26-29 on the rotor laminations 10. Each of the plates 20 and 21 is provided with openings 30 and 31 for purposes hereinafter explained, and it will be noted that adjacent edges of the rotor windings 16 and 17 are spaced apart so as to provide channels or slots 32 and 33 therebetween for purposes which will also be hereinafter explained. Similar closure plates are disclosed in my copending application Serial No. 753,276, filed August 5, 1958, now Patent No. 2,977,489, and entitled "Air Cooled Rotor Structure for Dynamo Electric Machines."

The housing or casing also comprises a hollow cylindrical member 34 preferably made of a metal, such as steel, and the end plates 14 and 15 are held against the ends of the sleeve 34 by means of bolts 35. A plurality of spacer bars 36 preferably made of a metal, such as steel, are secured to the inner wall of the sleeve 34, such as by welding. The spacer bars 36 engage and support stator laminations or core 37, also made of relatively high permeability, magnetic steel, and the laminations 37 are provided with a plurality of slots 38 for receiving and holding the wires of the stator windings 39, the turns of the windings 39 being wound, such as by lap winding, so as to provide a plurality of openings 40 through the end portions thereof extending beyond the outermost stator laminations 37 which permit the circulation of air between the wires of the stator windings 39. In one embodiment of the invention constructed by me, the windings 39 are wound and connected in a conventional manner so as to provide a three-phase output and so that when the rotor is rotated at approximately 3600 revolutions per minute the frequency of the voltage developed in the stator windings 39 is sixty cycles per second. Of course, it will be understood that the principles of the invention are equally applicable for other numbers of phases and for other energy frequencies or for direct current.

In the preferred embodiment of the invention a separate exciter, rather than brushes and a commutator, are employed for supplying direct current to the rotor windings 16 and 17. The exciter employed is a conventional form of exciter and comprises a plurality of stator windings 41, which may be energized by any suitable direct current source (not shown), mounted on stationary poles 42 supported from the member 34. The exciter also comprises a plurality of armature windings 43 mounted on the rotatable poles 44 supported from the rotor shaft 11. The armature windings 43 are connected in a conventional manner through rectifiers 45 to the coils 16 and 17 by means including the leads 46 and 47. When the shaft 11 is rotated an alternating current is developed in the armature windings 43 which is rectified by the rectifiers 45 and supplied as direct current to the rotor windings or coils 16 and 17.

The generator of the invention also includes a centrifugal fan or blower wheel 48 comprising a substantially imperforate plate 49, a plurality of curved blades 50 which extend both radially and longitudinally or axially of the generator and an annular disc 51 which interconnects and supports the ends of the blades 50. A centrifugal or blower fan of the type illustrated in the drawing has been found to be the most successful type and for a generator which is rated by me at ten kilowatts, the fan may, for example, be a type 912-10S blower fan or wheel manufactured by Revcor, Carpentersville, Illinois. Corresponding centrifugal fans made by other manufacturers may also be employed, and although other types of centrifugal types of fans, such as the type HE blower wheel manufactured by the Torrington Manufacturing Company, Torrington, Connecticut, have been employed in generators constructed by me and have been found to give improved results as compared to generators of the prior art, such other types of centrifugal fans permit temperature rises in certain parts of the generator substantially in excess of the temperature rises obtained when the generator contains a centrifugal fan of the type illustrated in the drawings. However, tests which I have performed show that disc or propeller type fans which produce air flows along lines substantially parallel to the axis of fan rotation are not satisfactory as a substitute for the centrifugal fan shown in the drawing and in fact permit temperature rises within the generator far in excess of those obtained in the preferred embodiment illustrated and described.

The end plate 14 at the end of the member 34 remote from the fan 48 is provided with a plurality of inlet openings, such as the inlet opening 52, and the member 34 is provided with a plurality of exhaust openings, such as the opening 53, adjacent the periphery of the fan 48. The sizes of the openings 52 and 53 are such as to permit unrestricted movement of the air propelled by the fan 48. It will be noted that the outer edges of the blades 50 are in closely spaced relation to and extend longitudinally substantially across the openings 53 so that substantially all of the air exhausted through the openings 53 must pass between the blades 50. The inner edges of the blades 50 are in closely spaced relation to and extend over the end portions of the stator windings 39 which extend beyond the stator laminations 37. Furthermore, the inner face of the plate 49 is in closely spaced relation with respect to the ends of the stator windings 39 so as to cause most of the air passing through the air cooling channels 32 and 33 between the rotor windings 16 and 17 and between the rotor laminations 10 and the stator laminations 37 to pass through the openings 40 between the wires of the stator windings 39. In addition, the annular disc 51 is relatively closely spaced with respect to the outermost lamination of the stator laminations 37 and provides an air passageway 54 between the said disc 51 and the outermost lamination of the stator laminations 37.

It will be apparent from FIG. 2 that the bars 36 space the peripheries of the stator laminations 37 from the inner wall of the member 34 so that a plurality of air cooling ducts or channels 55, defined by the edges of the bars 36, the peripheries of the stator laminations 37 and the inner wall of the member 34, are provided around the peripheries of the stator laminations 37. Cooling air for the stator laminations 37 flows through the channels 55 through the passageway 54, between the end portions of the stator windings 39 and the blades 50 and then outwardly between the blades 50 and through the exhaust openings 53. Although in some cases the air cooling channels may be passageways, such as the passageways 56, through the laminations themselves, either as a replacement for or in addition to the channels 55, such passageways 56 are not preferred because of the reduction in the volume of the magnetic steel and the need for additional punching of the stator laminations as well as the effect on eddy currents.

I have found that the following items are important in maintaining the temperature rise of the generator of the invention within the desired limits:

(1) The centrifugal fan 48 and its placement with respect to the other parts.

(2) The air cooling channels 32 and 33 in the rotor winding and hence the spacing of the adjacent portions of the rotor windings 16 and 17.

(3) The apertures 30 and 31 in the rotor winding retaining plates 20 and 21.

(4) Air cooling channels for the stator laminations such as the channels 55.

Each of the foregoing items causes a significant improvement in the cooling of the generator so that the use of each one of the features of the invention permits a substantial reduction in the size and weight of the generator as compared with the size and weight of generators of corresponding rating of the prior art. However, when all of the items are employed the greatly improved results indicated in Table I are obtained.

I have constructed generators of different ratings employing the principles of the invention and have made a large number of tests to determine the effects of the items set forth above. The test results set forth in the following Tables II and III are representative of the effects obtained with generators of different ratings, and the tests were conducted on an alternating current generator rated by me at ten kilowatts and having a three-phase, sixty cycles per second, one hundred and twenty to two hundred and eight volt output, the rotor shaft being rotated at thirty-six hundred revolutions per minute:

TABLE II

| | Fan Overlap, In. | Rotor Coil Spacing, In. | Rotor Plate Holes, Sq. In. | Stator Air Passages | Test Results | | | Output, 10 Kw. | |
|---|---|---|---|---|---|---|---|---|---|
| | | | | | Output, Kw. | Rotor Temp. Rise, °F. | Stator Temp. Rise, °F. | Stator Temp. Rise, °F. | Calc. Rotor Temp. Rise, °F. |

EFFECT OF FAN POSITION

| | | | | | | | | | |
|---|---|---|---|---|---|---|---|---|---|
| A | 1 | 3/8 | 2.3 | 12 | 15.84 | 84 | 14 | 1 | 25 |
| B | 5/8 | 3/8 | 2.3 | 12 | 15.12 | 93 | 18 | 9 | 33 |
| C | 0 | 3/8 | 2.3 | 12 | 14.76 | 125 | 31 | 12 | 55 |
| D | 1 | 1/8 | 2.3 | 12 | 14.76 | 135 | 15 | 3 | 46 |
| E | 0 | 1/8 | 2.3 | 12 | 14.76 | 140 | 23 | 9.5 | 72 |

EFFECT OF ROTOR WINDING SPACING

| | | | | | | | | | |
|---|---|---|---|---|---|---|---|---|---|
| A | 1 | 3/8 | 2.3 | 12 | 15.84 | 84 | 14 | 1 | 25 |
| D | 1 | 1/8 | 2.3 | 12 | 14.76 | 135 | 15 | 3 | 46 |
| C | 0 | 3/8 | 2.3 | 12 | 14.76 | 125 | 31 | 12 | 55 |
| E | 0 | 1/8 | 2.3 | 12 | 14.76 | 140 | 23 | 9.5 | 72 |
| I | 0 | 0 | 2.3 | 12 | 14.40 | 154 | 36 | 24 | 81 |

EFFECT OF OPENINGS IN ROTOR PLATE

| | | | | | | | | | |
|---|---|---|---|---|---|---|---|---|---|
| A | 1 | 3/8 | 2.3 | 12 | 15.84 | 84 | 14 | 1 | 25 |
| H | 1 | 3/8 | 0 | 12 | 15.12 | 101 | 9 | 8 | 37 |
| D | 1 | 1/8 | 2.3 | 12 | 14.76 | 135 | 15 | 3 | 46 |
| F | 1 | 1/8 | 0 | 12 | 14.40 | 140 | 26 | 29 | 91 |
| C | 0 | 3/8 | 2.3 | 12 | 14.76 | 125 | 31 | 12 | 55 |
| G | 0 | 3/8 | 0 | 12 | 15.12 | 132 | 30 | 21 | 80 |

EFFECT OF STATOR AIR PASSAGES

| | | | | | | | | | |
|---|---|---|---|---|---|---|---|---|---|
| D | 1 | 1/8 | 2.3 | 12 | 14.76 | 135 | 15 | 3 | 46 |
| J | 1 | 1/8 | 2.3 | 8 | 13.32 | 152 | 34 | 18 | 77 |
| K | 1 | 1/8 | 2.3 | 4 | 13.32 | 162 | 40 | 23 | 87 |

TABLE III

*Cumulative Effect*

| | Fan Over-lap, In. | Rotor Coil Spac-ing, In. | Rotor Plate Holes, Sq. In. | Test Results ||| Output, 10 Kw. ||
|---|---|---|---|---|---|---|---|---|
| | | | | Out-put, Kw. | Rotor Temp., °F. | Stator Temp., °F. | Stator Temp., °F. | Calc. Rotor Temp., °F. |
| A | 1 | 3/8 | 2.3 | 15.84 | 185 | 115 | 96 | 120 |
| C | 0 | 3/8 | 2.3 | 14.76 | 220 | 126 | 103 | 146 |
| I | 0 | 0 | 2.3 | 14.40 | 250 | 132 | 110 | 167 |
| L | 0 | 0 | 0 | 14.40 | 265 | 140 | 113 | 177 |

Twelve stator air cooling channels.

The approximate dimensions of the above-mentioned ten kilowatt generator which was tested by me are as follows:

TABLE IV

| | |
|---|---|
| Housing external diameter | 9 3/4 in. |
| Housing internal diameter | 9 3/8 in. |
| Housing length | 12 5/8 in. |
| Thickness rotor and stator laminations | 0.014 in. silicon steel. |
| Stator laminations diameter | 8 7/8 in. |
| Rotor laminations diameter | 5.01 in. |
| Spacing between rotor and stator | 0.050 in. |
| Axial length rotor and stator laminations | 5 in. |
| Closure plate size | 5 1/4 in. long by 2 1/2 in. wide. |
| Closure plate openings, each | 7/8 in. by 1 5/16 in. |
| Channels between stator laminations and housing—size, each | 1/4 in. by 2 5/8 in. |
| Fan external diameter | 9 1/8 in. |
| Fan blade internal diameter | 7 1/2 in. |
| Fan blade length | 1 3/16 in. |
| Fan blade spacing from stator winding | 1/8 in. |
| Fan spacing from stator laminations | 3/16 in. |
| Fan plate spacing from end of stator winding | 1/8 in. |

Generators of higher and lower ratings have the same construction and similar dimensions except that for generators of lower ratings the axial lengths of the housing and the rotor and stator laminations are less and for higher ratings the axial lengths of these parts are greater. The wire sizes of the rotor and stator windings may also be changed accordingly.

The first horizontal row of data in Tables II and III set forth above indicates the performance of the generator (identified by the letter "A") when all of the items mentioned above as being important are included in the generator and hence the generator is constructed and the parts thereof are arranged as set forth in the drawing and in Table IV above except for the omission of the stator passageways 56. The first vertical column indicates the length of the fan blades 50 in the axial direction of the generator which extends over the adjacent portion of the stator windings 39, the second column indicates the spacing between the portions of the rotor windings 16 and 17 within the rotor lamination slots, the third column indicates the area of the openings 30 and 31 in each of the rotor closure plates 20 and 21 and the fourth column indicates the number of air passages or channels 55 around the periphery of the stator laminations 37. Except for the last column in Tables II and III, the remaining columns indicate the test results obtained under the various conditions and the rotor temperature rise figures in the last column are obtained by extrapolation from curves prepared from tests of the performance of the generator.

It will be observed from the figures under the column identified as "Output, kw." that the output of the generator was different in different tests. This column indicates the maximum output of the generator when the rotor windings 16 and 17 have a one-half ampere current flowing therethrough and the supply voltage is ninety volts. In general, it will be noted that the maximum output of the generator falls off with larger temperature rises in the rotor and stator.

From the figures in Table II under the subtitle "Effect of Fan Position," it will be apparent that the amount that the fan blades 50 overlap the portions of the stator windings 39 extending outwardly beyond the stator laminations 37 has a substantial effect on the temperature rise of both the rotor and the stator, a decrease in the overlap causing an increase in the temperature rise. Similarly, from the figures in Table II under the subtitle "Effect of Rotor Winding Spacing" it will be noted that the temperature rise of the rotor and stator increases with a reduction in spacing between the portions of the rotor windings within the slots in the rotor laminations 10. The remaining figures in Table II show that the temperature rise increases when the area of the openings 30 and 31 in each of the closure plates 20 and 21 is decreased and when the number of stator air cooling passages or channels 55 is decreased. It is pertinent to note here that it was not possible to conduct tests at rated loading with no stator air channels 55 without producing temperature rises which would destroy the generator.

With respect to Table III above, this table indicates the cumulative effect of the various important items except for the stator air passages or channels 55 and the room temperature under which tests were conducted was approximately 100° F.

As mentioned above, the manner in which a generator may be rated varies with different manufacturers and different users. Generally speaking, the ratings indicate the performance of a generator at sea level and with a room temperature not greater than approximately 104° F. Under certain requirements the temperature rise of the rotor and stator must not exceed 122° F. when the power factor is 0.8, and with a power factor of a unity but with the generator overloaded by twenty five percent, the temperature rise preferably is not greater than 122° F. but should not exceed 140° F. Some users of the generators require such performance at higher altitudes and/or higher room temperatures and some users, such as the military agencies of the government, require temperature rises of not greater than 122° F. or 140° F. when the power factor is 0.8 and the generator is overloaded by twenty five percent. I have rated the above mentioned generator as a ten kilowatt generator on the assumption that it must meet the latter requirements. With the foregoing requirements in mind the forms of the generator of the invention which will meet the various requirements are indicated in the following table, the letters in the last column of the following table corresponding to the letters in Tables II and III:

TABLE V

*Generator Ratings*

| Rating || Power Factor | Over-Load, Per-cent | Rotor and Stator Temp. Rise, °F. || Generator Form |
|---|---|---|---|---|---|---|
| Kva. | Kw. | | | Rated Kw. | Over-load | |
| 15.6 | 12.5 | 0.8 or | 25 | 122 | 122 | A |
| 15 | 12 | 0.8 or | 25 | 122 | 122 | A, B and H |
| 14.4 | 11.5 | 0.8 or | 25 | 122 | 140 | A–H |
| 15 | 10 | 0.8 and | 25 | 122 | 122 | A, B and H |
| 15 | 10 | 0.8 and | 25 | 122 | 140 | A, B, G and H |

From the foregoing Table V, it will be apparent that the preferred form of the generator, form A, may be conservatively rated up to 12.5 kilowatts and 15.6 kilovolt amperes and may be operated at elevated room temperatures and above sea level. Furthermore, generator forms A, B and H may be conservatively rated up to 12 kilowatts and 15 kilovolt amperes and may also be operated at levels above sea level and at room temperatures higher than 104° F. without danger of an excessive temperature rise. In addition, generator forms A through H may be conservatively rated up to 11.5 kilowatts and 14.4 kilovolt amperes but generator form I must be given some lower rating whereas generator forms J, K and L cannot be rated as high as 10 kilowatts. Also, while generators A, B, G and H may all be rated at 10 kilowatts and 15 kilovolt amperes, if the temperature rises for the rotor and stator are respectively 122° and 140° for both rated power output and a twenty five percent overload with a power factor of 0.8, when the generator must withstand simultaneously an overload of twenty five percent and a power factor of 0.8, none of the other generators may be so rated.

It is clear from the foregoing data that when the generator includes all of the important items set forth above (forms A and B), a substantial improvement in the cooling of the generator results. However, comparing forms A and B with form C, it will be found that elimination of overlap of the fan blades 50 with the end portions of the stator windings 39 causes almost a fifty percent increase in the rotor temperature rise. In addition, by comparing forms D and E, it will be seen that although fan blade overlap causes some reduction in the rotor temperature rise, the reduction of the rotor winding spacing to one-eighth of an inch has a greater effect on the rotor temperature rise. Other similar comparisons may be made, and in general, it may be concluded that the generator requires a plurality of stator air cooling channels and at least one other of the remaining three important items set forth above.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. An electrical generator comprising in combination: a housing including a tubular member having air inlet openings at a first end thereof and air exhaust openings at the other, second end thereof; a stator core mounted on and within said member intermediate said inlet and exhaust openings, said core having a central opening therein extending axially of said member from a first end of said core nearest said first end of said member to the opposite, second end thereof; a stator winding on said core adjacent said central opening and radially spaced from said tubular member, said winding having first and second portions of the turns thereof extending respectively axially beyond said first and second ends of said core, said second portions having radially extending winding openings between turns thereof and said core also forming at least one wall of a plurality of first air cooling channels disposed intermediate said stator winding and the inner wall of said member and extending from said first end of said core to the second end thereof adjacent the space between said second portions and said exhaust openings which channels permit cooling air to flow from said air inlet openings along surfaces of said core, exterior to said stator winding, to said exhaust openings; a rotor mounted in said central opening, said rotor having circumferentially spaced windings thereon forming walls of second air cooling channels extending axially of said rotor from one end to the other thereof and the space between the ends of said second channels and said winding openings being unobstructed to permit air to flow from said inlet openings between and along said rotor windings to the radially interior sides of said winding openings and thereafter flow through said winding openings to said exhaust openings; and a centrifugal fan mounted on said rotor adjacent said second portions and having a plurality of axially and radially extending fan blades mounted in radially outward alignment with said winding openings and intermediate said winding openings and said exhaust openings, whereby rotation of said rotor and said fan cause the flow of air along two paths, one from said inlet openings through said first channels and thence outwardly between said blades and through said exhaust openings and the other from said inlet openings through said second channels and thence outwardly through said winding openings, between said blades and through said exhaust openings.

2. An electrical generator comprising in combination: a housing including a tubular member having an air inlet opening at a first end thereof and a plurality of peripherally disposed air exhaust openings at the other, second end thereof, said exhaust openings extending radially outwardly from the axis of said member; a stator core mounted on and within said member intermediate said inlet opening and said exhaust openings, said core having a central opening therein extending axially of said member from a first end of said core nearest said first end of said member to the opposite second end thereof; a stator winding on said core adjacent said central opening and radially spaced from said tubular member, said winding having first and second portions of the turns thereof extending respectively axially beyond said first and second ends of said core, said second portions having radially extending winding openings between turns thereof and said second portions underlying and being spaced from said exhaust openings, said winding openings being radially aligned with said exhaust openings to permit air flowing centrally of said core to pass through said winding openings and radially outwardly through said exhaust openings, said core also forming at least one wall of a plurality of first air cooling channels disposed intermediate said stator winding and the inner wall of said member and extending from said first end of said core to the second end thereof adjacent the space between said second portions and said exhaust openings which channels permit cooling air to flow from said air inlet opening along surfaces of said core, exterior to said stator winding, to said exhaust openings; a rotor mounted in said central opening, said rotor having circumferentially spaced windings thereon forming walls of second air cooling channels extending axially of said rotor from one end to the other thereof and the space between the ends of said second channels and said winding openings being unobstructed to permit air to flow from said inlet opening between and along said rotor windings to the radially interior sides of said winding openings and thereafter flow through said winding openings to said exhaust openings; and a centrifugal fan mounted on said rotor adjacent said second portions and having a plurality of axially and radially extending fan blades intermediate said winding openings and said exhaust openings, whereby rotation of said rotor and said fan causes the flow of air along two paths, one from said inlet opening through said first channels and thence outwardly between said blades and through said exhaust openings and the other from said inlet opening through said second channels and thence outwardly through said winding openings between said blades and through said exhaust openings.

3. An electrical generator comprising in combination: a housing including a tubular member having an air inlet opening at a first end thereof and a plurality of peripherally disposed air exhaust openings therethrough at the other, second end thereof, said exhaust openings extending radially outwardly from the axis of said member; an annular stator core mounted within said member intermediate said inlet opening and said exhaust openings and with the axis thereof extending parallel to the axis of said member, said core having a central opening therethrough extending axially thereof from a first end thereof nearest said first end of said member to the opposite second end thereof; a stator winding on said core around and adjacent said central opening and radially spaced from said tubular member, said winding having first and second portions of the turns thereof extending respectively axially beyond said first and second ends of said core, said portions respectively having first and second radially extending winding openings between turns thereof and said second winding openings radially underlying and being spaced from said exhaust openings, said core also forming at least one wall of a plurality of air cooling channels disposed intermediate said stator winding and the inner wall of said member and extending from said first end of said core to the second end thereof adjacent the space between said second portions and said exhaust openings which channels permit cooling air to flow from said air inlet along surfaces of said core exterior to said stator winding to said exhaust openings; a rotor mounted in said central opening, said rotor having circumferentially spaced windings thereon forming walls of air cooling channels extending axially of said rotor from one end to the other thereof and the space between the ends of said last-mentioned channels and said second winding openings being unobstructed to permit air to flow from said inlet opening between and along said rotor windings to the radially interior sides of said second winding openings and thereafter flow radially through said last-mentioned openings to said exhaust openings; and a centrifugal fan having a plurality of axially and radially extending fan blades disposed intermediate said second portions and said exhaust openings, each blade overlying at least one-half the axial length of said second portions.

4. An electrical generator comprising in combination: a housing including a tubular member having an air inlet opening at a first end thereof and a plurality of peripherally disposed air exhaust openings therethrough at the other, second end thereof, said exhaust openings extending radially outwardly from the axis of said member; an annular stator core mounted within said member intermediate said inlet opening and said exhaust openings and with the axis thereof extending parallel to the axis of said member, said core having a central opening therethrough extending axially thereof from a first end thereof nearest said first end of said member to the opposite second end thereof; a stator winding on said core around and adjacent said central opening and radially spaced from said tubular member, said winding having first and second portions of the turns thereof extending respectively axially beyond said first and second ends of said core, said portions respectively having first and second radially extending winding openings between turns thereof and said second winding openings radially underlying and being spaced from said exhaust openings, said second winding openings being disposed between planes perpendicular to the axis of said core and passing through said exhaust openings to permit air flowing centrally of said core to pass through said second winding openings and radially outwardly through said exhaust openings, said core also forming at least one wall of a plurality of air cooling channels disposed intermediate said stator winding and the inner wall of said member and extending from said first end of said core to the second end thereof adjacent the space between said second portions and said exhaust openings which channels permit cooling air to flow from said air inlet along surfaces of said core exterior to said stator winding to said exhaust openings; a rotor mounted in said central opening, said rotor having circumferentially spaced windings thereon forming walls of air cooling channels extending axially of said rotor from one end to the other thereof and the space between the ends of said last-mentioned channels and said second winding openings being unobstructed to permit air to flow from said inlet opening between and along said rotor windings to the radially interior sides of said second winding openings and thereafter flow radially through said last-mentioned openings to said exhaust openings; and a centrifugal fan comprising a substantially imperforate supporting disc mounted on said rotor and in close spaced relation to the axial ends of said second portions and forming one wall for the space between said second portions and said exhaust openings, a plurality of axially and radially extending fan blades mounted on said disc intermediate said second portions and said exhaust openings and each blade extending axially from said disc into close spaced relation with said second end of said core and extending radially from close spaced relation to said second portions to close spaced relation to the inner wall of said member.

References Cited in the file of this patent

UNITED STATES PATENTS

| | | |
|---|---|---|
| 1,654,305 | Nottage | Dec. 27, 1927 |
| 2,610,992 | Johns | Sept. 16, 1952 |
| 2,620,449 | March | Dec. 21, 1952 |
| 2,634,379 | Brainard | Apr. 7, 1953 |
| 2,761,987 | Beckwith | Sept. 4, 1956 |
| 2,899,573 | Wesolowski | Aug. 11, 1959 |
| 2,900,538 | Tudge | Aug. 18, 1959 |

FOREIGN PATENTS

| | | |
|---|---|---|
| 174,436 | Switzerland | Apr. 16, 1935 |
| 877,034 | Germany | May 18, 1953 |